(12) United States Patent
Hoshino et al.

(10) Patent No.: US 9,068,321 B2
(45) Date of Patent: Jun. 30, 2015

(54) HYBRID DRIVEN HYDRAULIC WORK MACHINE

(71) Applicant: HITACHI CONSTRUCTION MACHINERY CO., LTD., Tokyo (JP)

(72) Inventors: Masatoshi Hoshino, Tsuchiura (JP); Shinji Ishihara, Hitachinaka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/344,615

(22) PCT Filed: Oct. 18, 2012

(86) PCT No.: PCT/JP2012/076963
§ 371 (c)(1),
(2) Date: Mar. 13, 2014

(87) PCT Pub. No.: WO2013/058325
PCT Pub. Date: Apr. 25, 2013

(65) Prior Publication Data
US 2015/0008054 A1 Jan. 8, 2015

(30) Foreign Application Priority Data
Oct. 19, 2011 (JP) .................................. 2011-230053

(51) Int. Cl.
*B60K 3/02* (2006.01)
*E02F 9/20* (2006.01)
(Continued)

(52) U.S. Cl.
CPC .............. *E02F 9/2075* (2013.01); *F02D 29/04* (2013.01); *G05B 11/00* (2013.01); *H02J 7/14* (2013.01);
(Continued)

(58) Field of Classification Search
CPC ........................................................ B60K 3/00

USPC ......................................................... 180/302
See application file for complete search history.

(56) References Cited

U.S. PATENT DOCUMENTS 5,810,694 A * 9/1998 Kamada et al. ................ 477/150
6,925,977 B2 * 8/2005 Hirowatari et al. ......... 123/90.17
(Continued)

FOREIGN PATENT DOCUMENTS

JP 2002-275945 9/2002
JP 2003-028071 1/2003

OTHER PUBLICATIONS

International Preliminary Report on Patentability received in International Application No. PCT/JP2012/076963 dated May 1, 2014.

*Primary Examiner* — John Walters
*Assistant Examiner* — James Triggs
(74) *Attorney, Agent, or Firm* — Mattingly & Malur, PC

(57) ABSTRACT

A hybrid-driven hydraulic work machine maintains the torque of the engine at a prescribed value when the load on a hydraulic pump is higher than the rated power of the engine and the electric assist motor assists the torque of the engine. Control of the engine revolution speed is based on the target revolution speed of the engine; engine load calculation; and at least one of: electric motor power running calculation which calculates a differential revolution speed between the target engine revolution speed and the revolution speed of the engine and performs power running control on the electric assist motor depending on the differential revolution speed when the engine load is a prescribed value or higher; and a hydraulic pump absorption torque calculation which performs reduction control on absorption torque of the hydraulic pump depending on the differential revolution speed when the engine load is a prescribed value or higher.

4 Claims, 11 Drawing Sheets

(51) Int. Cl.
  *F02D 29/04* (2006.01)
  *G05B 11/00* (2006.01)
  *B60K 6/485* (2007.10)
  *B60W 20/00* (2006.01)
  *E02F 9/22* (2006.01)
  *H02J 7/14* (2006.01)

(52) U.S. Cl.
  CPC ............. *B60L 2200/40* (2013.01); *B60K 6/485* (2013.01); *B60W 20/10* (2013.01); *B60W 2300/17* (2013.01); *E02F 9/2296* (2013.01)

(56) References Cited

U.S. PATENT DOCUMENTS

| | | | | |
|---|---|---|---|---|
| 7,082,358 B2 * | 7/2006 | Sugo | .......................... | 701/34.3 |
| 7,096,107 B2 * | 8/2006 | Michi et al. | ...................... | 701/70 |
| 7,376,499 B2 * | 5/2008 | Salman et al. | ............... | 701/30.2 |
| 7,469,534 B2 * | 12/2008 | Nishi et al. | ...................... | 60/428 |
| 7,835,839 B2 * | 11/2010 | Hori et al. | ........................ | 701/51 |
| 8,579,760 B2 * | 11/2013 | Imamura et al. | ................... | 477/7 |
| 2010/0116235 A1 * | 5/2010 | Imamura et al. | ........... | 123/179.3 |

* cited by examiner

HYBRID DRIVEN HYDRAULIC WORK MACHINE

TECHNICAL FIELD

The present invention relates to a hydraulic work machine such as a hydraulic excavator, and in particular, to a hybrid-driven hydraulic work machine equipped with an electric assist motor that is driven by an engine, an electricity storage device, or the like.

BACKGROUND ART

In the field of hydraulic work machines such as hydraulic excavators, there have recently been proposed/developed hybrid-driven hydraulic work machines that are equipped with an electric assist motor (which is driven by an electricity storage device such as a battery) as a driving source other than the engine.

For example, a construction machine (hydraulic work machine) proposed in Patent Literature 1 is equipped with an electric assist motor driven by the engine. When there is a surplus in the engine output, the surplus engine output is stored as electric energy so as to achieve energy saving. When the engine output is insufficient, the electric motor is driven by discharging the stored electric energy so as to maintain necessary pump absorption torque. It is stated in the Patent Literature 1 that such a configuration enables employment of a small-sized engine (having rated output power equivalent to the average power necessary when the construction machine carries out operations), improvement in the fuel efficiency, and reduction in the $CO_2$ emission.

In the construction machine proposed in the Patent Literature 1, when the workload is high and the requested power of the hydraulic pump (pump absorption torque) is greater than the rated power of the engine, assistance of the engine is carried out by performing the power running control on the electric assist motor to make the electric assist motor generate the differential power. Therefore, the hydraulic pump is enabled to generate power equivalent to that in conventional machines irrespective of the employment of a smaller-sized engine compared to those in the conventional machines of the non-hybrid-driven type. It is presumed in this construction machine that the engine continues generating the rated output power when the electric assist motor is assisting the engine. It is very important for the engine to continue generating the rated output power as will be explained below. However, no concrete method for enabling the engine to continue generating the rated output power is described in the Patent Literature 1.

PRIOR ART LITERATURE

Patent Literature

Patent Literature 1: JP,A 2002-275945

SUMMARY OF THE INVENTION

Problem to be Solved by the Invention

In above-described hybrid-driven hydraulic work machines, the engine is controlled at a constant revolution speed by a governor or the like. In contrast, the electric assist motor undergoes the so-called revolution speed control (for generating torque so as to reduce the deviation between the actual engine revolution speed and the target revolution speed) when the requested power of the hydraulic pump is greater than the rated power of the engine in order to prevent the drop in the engine revolution speed caused by the increase in the requested power of the hydraulic pump.

Therefore, when both the engine and the electric assist motor are performing the driving, the engine and the electric assist motor undergo revolution speed control separately and independently while using the same engine revolution speed as their target values.

In such a hydraulic work machine, an increase in the aforementioned load on the hydraulic pump is expected to lead to transient operations described below.

For example, when the target revolution speed of the engine is its rated revolution speed and the engine is operating within its rated torque, an increase in the load on the hydraulic pump is expected to lead to the following operations:

(1) The engine increases the engine torque to the rated torque in order to maintain the revolution speed at the target revolution speed by means of the revolution speed control.

(2) When the load on the hydraulic pump increases further, still further increase of the engine torque is impossible, and thus the engine cannot maintain the target revolution speed and the actual revolution speed of the engine drops.

(3) Since a revolution speed deviation occurs between the target revolution speed and the actual revolution speed of the engine, the revolution speed control of the electric assist motor is activated. Torque generated by the electric assist motor assists the engine and increases the engine revolution speed.

However, since the revolution speed control of the engine and the electric assist motor are executed separately and independently, when the actual revolution speed of the engine (which dropped once) increases again due to the aforementioned operation (3), the load on the engine decreases and thus the engine torque can fall below the rated torque due to the revolution speed control of the engine.

In order to prevent such a decrease in the engine torque, it is possible, from the viewpoint of steady state transition, to consider control that prevents the torque generated by the electric assist motor from exceeding the difference between the absorption torque of the hydraulic pump and the rated torque of the engine. However, implementing such an operation in the transient response is difficult.

When the engine torque falls below the rated torque, continuation of the assistance by the electric assist motor becomes necessary. If the assistance by the electric assist motor continues longer than a certain time period, the electric power stored in the battery decreases. Consequently, the operable time (duration time) of the electric assist motor decreases and the charging of the battery becomes necessary. For the battery charging, the electric assist motor has to be driven as a generator by the engine. In such cases, the fuel efficiency and workability of the hydraulic work machine are deteriorated and the significance of the hybrid driving is impaired.

It is therefore the primary object of the present invention to provide a hybrid-driven hydraulic work machine having an electric assist motor linked to the engine and the hydraulic pump, performing the revolution speed control on the engine and the electric assist motor independently, and being capable of maintaining the torque of the engine at a prescribed value (e.g., rated torque) when the load on the hydraulic pump is higher than the rated power of the engine and the electric assist motor performs the torque assistance.

Means for Solving the Problem

To achieve the above object, according to a first aspect of the present invention, there is provided a hybrid-driven hydraulic work machine comprising an engine, a hydraulic pump of the variable displacement type which is driven and rotated by the engine, an electric assist motor which is linked to the engine and the hydraulic pump, a plurality of actuators which are driven by hydraulic fluid delivered from the hydraulic pump, and a plurality of operation devices having operation members and outputting operation signals corresponding to operations on the operation members to cause the actuators to operate. The hybrid-driven hydraulic work machine comprises: revolution speed detection means which detects revolution speed of the engine; a storage device which has stored a preset engine setup revolution speed of the engine; target engine revolution speed calculation means which sets a target revolution speed of the engine at the engine setup revolution speed stored in the storage device; engine control means which controls the revolution speed of the engine based on the target revolution speed of the engine; engine load calculation means which calculates an engine load based on an engine torque signal from the engine control means; and at least one selected from the following: electric motor power running calculation means which calculates a differential revolution speed between the target engine revolution speed and the revolution speed of the engine and performs power running control on the electric assist motor depending on the differential revolution speed when the engine load is a prescribed value or higher; and hydraulic pump absorption torque calculation means which performs reduction control on absorption torque of the hydraulic pump depending on the differential revolution speed when the engine load is a prescribed value or higher.

According to a second aspect of the present invention, there is provided a hybrid-driven hydraulic work machine comprising an engine, a hydraulic pump of the variable displacement type which is driven and rotated by the engine, an electric assist motor which is linked to the engine and the hydraulic pump, a plurality of actuators which are driven by hydraulic fluid delivered from the hydraulic pump, and a plurality of operation devices having operation members and outputting operation signals corresponding to operations on the operation members to cause the actuators to operate. The hybrid-driven hydraulic work machine comprises: revolution speed detection means which detects revolution speed of the engine; a storage device which has stored a preset engine setup revolution speed of the engine; target engine revolution speed calculation means which sets a target revolution speed of the engine at the engine setup revolution speed stored in the storage device; engine control means which controls the revolution speed of the engine based on the target revolution speed of the engine; and at least one selected from the following:

target electric motor revolution speed calculation means which sets a particular revolution speed within the target revolution speed of the engine set by the target engine revolution speed calculation means as a target revolution speed of the electric assist motor and electric motor power running calculation means which calculates a differential revolution speed between the target electric motor revolution speed and the revolution speed of the engine and performs power running control on the electric assist motor depending on the differential revolution speed when the revolution speed of the engine has fallen below the target revolution speed of the electric assist motor; and target hydraulic pump revolution speed calculation means which sets a particular revolution speed within the target revolution speed of the engine set by the target engine revolution speed calculation means as a target revolution speed of the hydraulic pump and hydraulic pump absorption torque calculation means which calculates a differential revolution speed between the target hydraulic pump revolution speed and the revolution speed of the engine and performs reduction control on absorption torque of the hydraulic pump depending on the differential revolution speed when the revolution speed of the engine has fallen below the target revolution speed of the hydraulic pump.

According to a third aspect of the present invention, there is provided the hybrid-driven hydraulic work machine as described in the first aspect, wherein when the value of the engine load calculated by the engine load calculation means falls below a maximum value at the revolution speed of the engine or a prescribed value in the vicinity of the maximum value, at least one selected from the following is executed: cancellation of the power running control of the electric assist motor by the electric motor power running calculation means; and cancellation of the reduction control of the absorption torque of the hydraulic pump by the hydraulic pump absorption torque calculation means.

According to a fourth aspect of the present invention, there is provided the hybrid-driven hydraulic work machine as described in the second aspect, wherein at least one selected from the following is executed: cancellation of the power running control of the electric assist motor by the electric motor power running calculation means when the revolution speed of the engine exceeds the target electric motor revolution speed by a prescribed value or more; and cancellation of the reduction control of the absorption torque of the hydraulic pump by the hydraulic pump absorption torque calculation means when the revolution speed of the engine exceeds the target hydraulic pump revolution speed by a prescribed value or more.

Effect of the Invention

According to the present invention, in a hydraulic work machine having an electric assist motor linked to the engine and the hydraulic pump and performing the revolution speed control on the engine and the electric assist motor independently, in response to the exceeding of the load on the hydraulic pump over the maximum torque of the engine at its revolution speed, the electric assist motor assists the engine with the minimum torque that the engine lacks. Therefore, the engine is allowed to continuously generate the maximum torque. Consequently, advantages of the hybrid driving, such as improvement in fuel efficiency, can be achieved to the fullest extent.

MODE FOR CARRYING OUT THE INVENTION

First Embodiment

Figure 1:
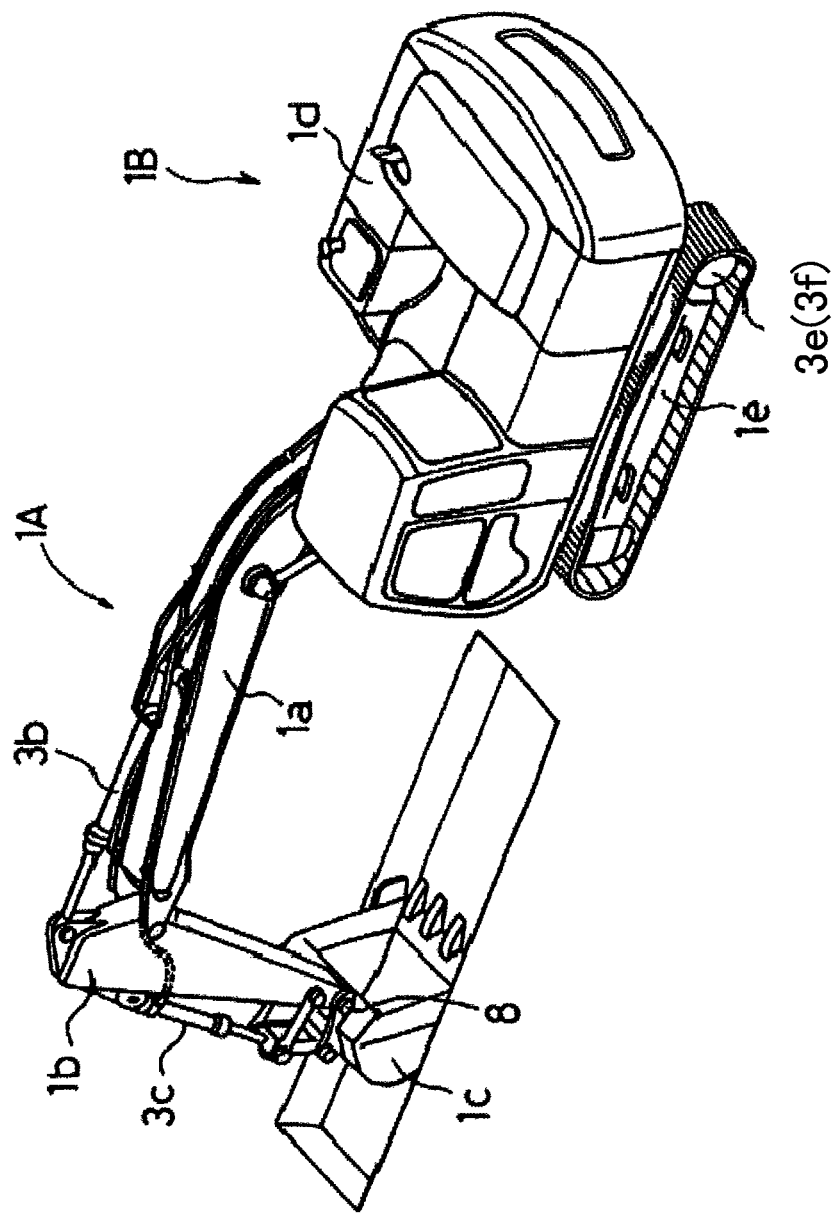
FIG. 1 is a perspective view showing a hydraulic excavator as a first embodiment of a hybrid-driven hydraulic work machine in accordance with the present invention.

Embodiments in accordance with the present invention will be described below with reference to figures. FIG. 1 is a perspective view showing a hydraulic excavator as a first embodiment of a hybrid-driven hydraulic work machine in accordance with the present invention.

The hydraulic excavator is formed of a multijoint front work implement 1A including a boom 1a, an arm 1b and a bucket 1c each rotating in the vertical direction and a vehicle body 1B including an upper swing structure 1d and a lower travel structure 1e. The base end of the boom 1a of the front work implement 1A is supported by a front part of the upper swing structure 1d. The boom 1a, the arm 1b, the bucket 1c, the upper swing structure 1d and the lower travel structure 1e are driven by a boom cylinder 3a, an arm cylinder 3b, a bucket cylinder 3c, a swing electric motor 16 (see FIG. 2) and left and right travel motors 3e and 3f, respectively. The operations of the boom 1a, the arm 1b, the bucket 1c and the upper swing structure 1d are specified (commanded) by hydraulic operation signals (control pilot pressures) supplied from control lever devices 4a and 4b (see FIG. 2). The operation of the lower travel structure 1e is specified (commanded) by a hydraulic operation signal (control pilot pressure) supplied from a travel control pedal device (not shown).

Figure 2:
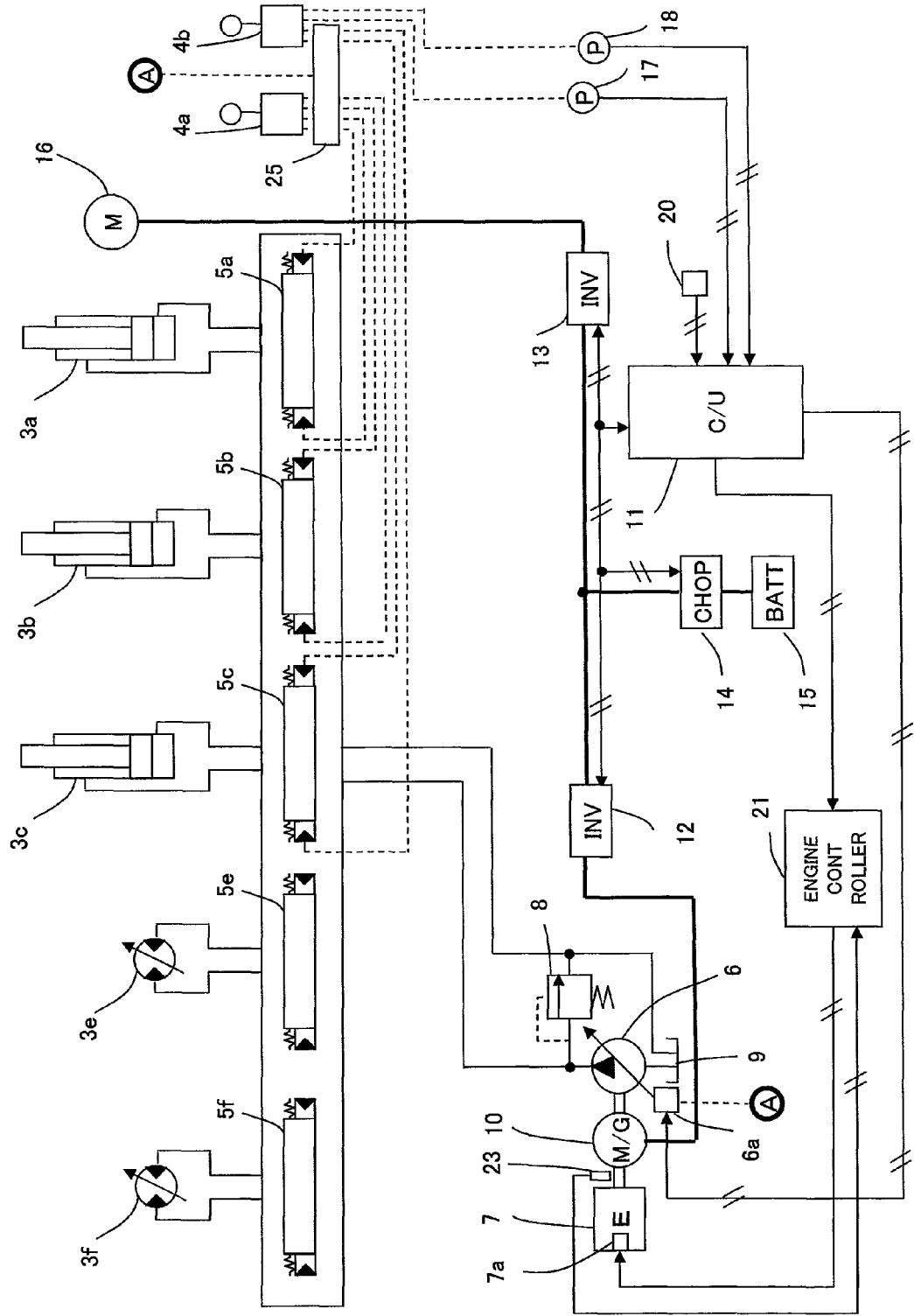
FIG. 2 is a configuration diagram of an actuator drive control system installed in the hydraulic excavator as the first embodiment of the hybrid-driven hydraulic work machine in accordance with the present invention.

FIG. 2 is a configuration diagram of an actuator drive control system installed in the hydraulic excavator as the first embodiment of the hybrid-driven hydraulic work machine in accordance with the present invention.

In FIG. 2, the actuator drive control system in this embodiment comprises the control lever devices 4a and 4b, the unshown travel control pedal device, spool-type directional control valves 5a-5c, 5e and 5f, a main hydraulic pump 6, an engine 7, a main relief valve 8, a tank 9, and a shuttle valve block 25.

The control lever devices 4a and 4b and the control pedal device generate control pilot pressures (hydraulic operation signals) by reducing (decompressing) primary pressure, generated by hydraulic fluid delivered from an unshown pilot pump, into secondary pressures according to the operation angles (open angles) of pressure reducing valves of the control lever devices 4a and 4b and the control pedal device, respectively. The control pilot pressures are supplied to pressure-receiving parts of the directional control valves 5a-5c, 5e and 5f and switch the directional control valves 5a-5c, 5e and 5f from their neutral positions. Although their supply/discharge line systems are unshown for the convenience of drawing, the directional control valves 5a-5c, 5e and 5f are spool valves of the open center type arranged in a center bypass line, for example. According to the switching control by the control pilot pressures, the directional control valves 5a-5c, 5e and 5f control the flow (direction and flow rate) of the hydraulic fluid delivered from the hydraulic pump 6 and thereby control the driving of the hydraulic actuators 3a-3c, 3e and 3f. The hydraulic pump 6 is driven and rotated by the engine 7. When the pressure inside a hydraulic line to which the hydraulic fluid delivered from the hydraulic pump 6 is lead rises excessively, the relief valve 8 releases the hydraulic fluid to the tank 9 and thereby prevents an excessive increase in the pressure inside the hydraulic line.

The shuttle valve block 25 selects and outputs a hydraulic operation signal of the highest pressure from the hydraulic operation signals (control pilot pressures) generated by the control lever devices 4a and 4b (except the hydraulic operation signal specifying the swing operation) and the hydraulic operation signal generated by the unshown control pedal device.

The hydraulic pump 6 is a pump of the variable displacement type. The hydraulic pump 6 includes a regulator 6a which operates according to the positive control method. The hydraulic operation signal outputted by the shuttle valve block 25 is lead to the regulator 6a. As is publicly known, the regulator 6a according to the positive control method increases the swash plate tilting angle (displacement) of the hydraulic pump 6 and thereby increases the delivery flow rate of the hydraulic pump 6 with the rise in the hydraulic operation signal due to an increase in the operation amounts (requested flow rates) of control levers and a control pedal (as operation members of the control lever devices 4a and 4b and the control pedal device).

The regulator 6a according to the positive control method changes the setup value of its maximum torque according to a control signal supplied from a vehicle body controller 11 which will be explained later. Therefore, even when the aforementioned hydraulic operation signal rises, for example, the delivery flow rate of the hydraulic pump 6 is limited within a flow rate corresponding to the maximum torque setup value in cases where the hydraulic operation signal exceeds the maximum torque setup value specified by the vehicle body controller 11.

The actuator drive control system in this embodiment includes an electric assist motor 10, the vehicle body controller 11, inverters 12 and 13, a chopper 14, a battery 15, pressure sensors 17 and 18, an engine control dial 20, a revolution sensor 23 (for detecting the revolution speed of the engine 7), and an engine controller 21.

The electric assist motor 10 is linked between the hydraulic pump 6 and the engine 7. The electric assist motor 10 has both a function as a generator (converting the power of the engine 7 into electric energy (electric power) and outputting the electric power to the inverter 12) and a function as an electric motor (being driven by electric energy (electric power) supplied from the inverter 12 and performing the assistant driving of the hydraulic pump 6).

When the electric assist motor 10 functions as a generator, the inverter 12 converts AC power generated by the electric assist motor 10 into DC power and outputs the DC power. When the electric assist motor 10 functions as an electric motor, the inverter 12 converts DC power supplied from the battery 15 into AC power and supplies the AC power to the electric assist motor 10.

The inverter 13 converts the DC power as the conversion output from the inverter 12 into AC power and supplies the AC power to the swing electric motor 16. Further, the inverter 13 converts AC power regenerated by the swing electric motor 16 (functioning as a generator at the time of swing braking) into DC power and outputs the DC power.

The battery 15 adjusts the voltage via the chopper 14, supplies electric power to the inverters 12 and 13, and stores the electric energy generated by the electric assist motor 10 and electric energy supplied from the swing electric motor 16.

The engine control dial 20 is a component operated by the operator. According to the operator's intention, the engine control dial 20 commands a basic revolution speed of the engine 7. The vehicle body controller 11 receives the command signal from the engine control dial 20, calculates a target revolution speed based on the command signal, and outputs the calculated target revolution speed to the engine controller 21. The engine controller 21 calculates the deviation between the target revolution speed inputted from the vehicle body controller 11 and the actual revolution speed of the engine 7 detected by the revolution sensor 23, calculates a target fuel injection quantity based on the revolution speed deviation, and outputs a control signal corresponding to the calculated target fuel injection quantity to an electronic governor 7a of the engine 7. The electronic governor 7a operating according to the control signal injects and supplies the fuel to the engine 7 for the amount corresponding to the target fuel injection quantity. Consequently, the engine is controlled so that the target revolution speed is maintained.

The vehicle body controller 11 includes a control calculation circuit. The control calculation circuit performs the following control related to the electric assist motor 10 and the swing electric motor 16.

(1) Drive Control of Swing Electric Motor 16

The pressure sensors 17 and 18, which are connected to pilot hydraulic lines leading the hydraulic operation signals specifying the left and right swing operations (included in the hydraulic operation signals generated by the control lever device 4b), detect the hydraulic operation signals. The vehicle body controller 11 receives detection signals (electric signals) from the pressure sensors 17 and 18 and performs the drive control on the swing electric motor 16 according to the detected hydraulic operation signals. Specifically, when a hydraulic operation signal specifying a swing operation to the left is detected, the vehicle body controller 11 executes power generation control (making the electric assist motor 10 operate as a generator) by controlling the inverter 12 based on the hydraulic operation signal, while making the swing electric motor 16 operate to swing the upper swing structure 1d to the left at a speed corresponding to the hydraulic operation signal by executing power running control (driving the swing electric motor 16 by controlling the inverter 13). When a hydraulic operation signal specifying a swing operation to the right is detected, the vehicle body controller 11 executes the power generation control (making the electric assist motor 10 operate as a generator) by controlling the inverter 12 based on the hydraulic operation signal, while making the swing electric motor 16 operate to swing the upper swing structure 1d to the right at a speed corresponding to the hydraulic operation signal by executing the power running control (driving the swing electric motor 16 by controlling the inverter 13).

(2) Electricity Storage Control of Recovered Electric Power

At the time of the swing braking, the vehicle body controller 11 recovers electric energy from the swing electric motor 16 by executing power generation control (making the swing electric motor 16 operate as a generator) by controlling the inverter 13, while also executing control of storing the recovered electric energy in the battery 15.

(3) Control of Electric Assist Motor 10

When the hydraulic load on the hydraulic pump 6 (pump absorption torque) is low and the remaining electric amount of the battery 15 is low, the vehicle body controller 11 makes the electric assist motor 10 generate surplus electric power by executing the power generation control (making the electric assist motor 10 operate as a generator) by controlling the inverter 12, while also executing control of storing the generated surplus electric power in the battery 15. In contrast, when the hydraulic load on the hydraulic pump 6 (pump absorption torque) is high and the remaining electric amount of the battery 15 is a prescribed amount or more, the vehicle body controller 11 executes assistant driving of the hydraulic pump 6 by performing power running control (making the electric assist motor 10 operate as an electric motor by supplying the electric power of the battery 15 to the electric assist motor 10 by controlling the inverter 12).

Figure 3:
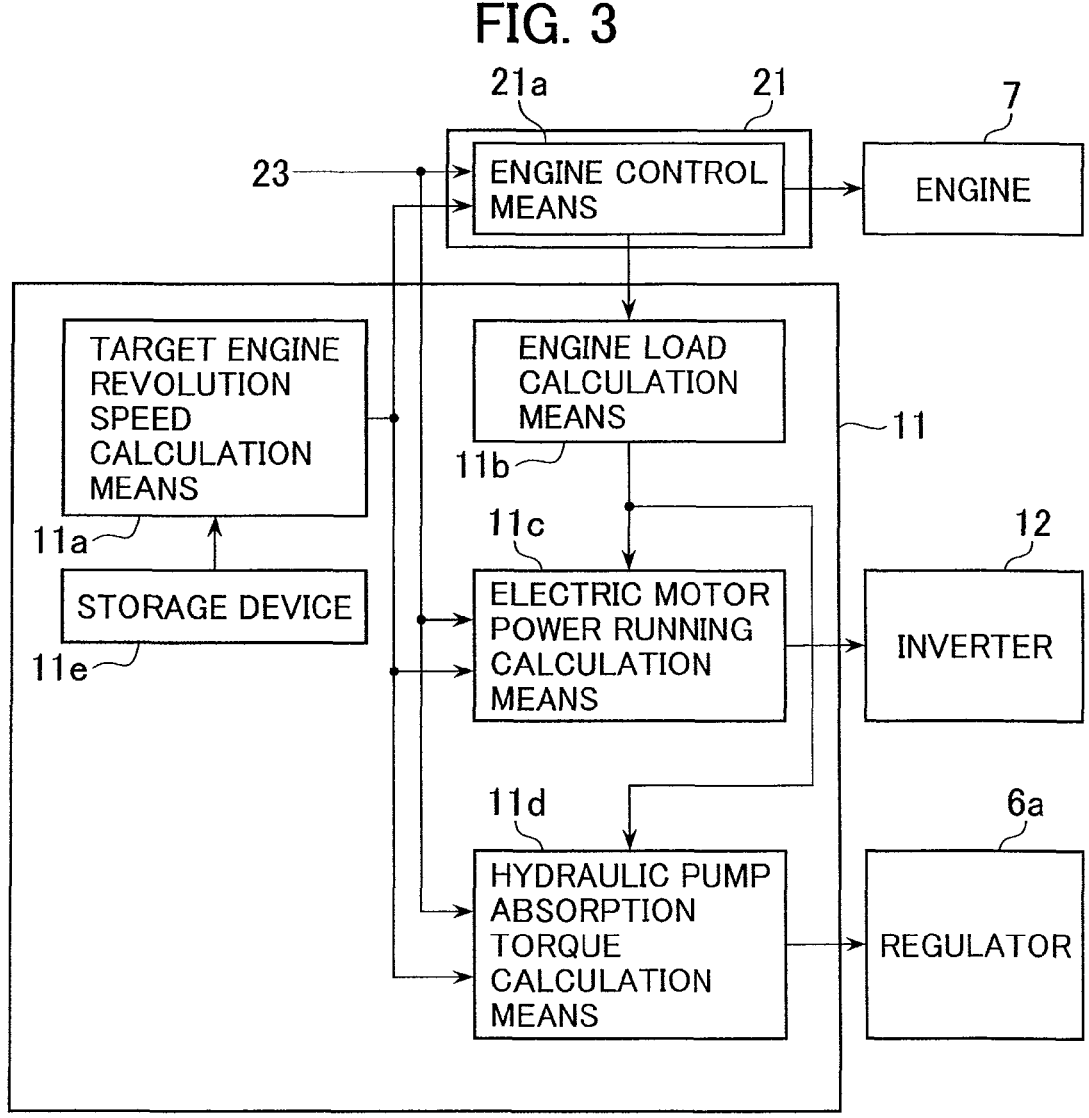
FIG. 3 is a functional block diagram showing processing for revolution speed control of an engine, an electric motor and a hydraulic pump by a vehicle body controller, etc. constituting the first embodiment of the hybrid-driven hydraulic work machine in accordance with the present invention.

Next, an example of a control method for preventing a drop in the torque of the engine 7 when the electric assist motor 10 assists the engine 7 in a revolution speed control system (which controls a revolution system including the engine 7, the electric assist motor 10 and the hydraulic pump 6 by use of the target revolution speed) will be explained below referring to FIG. 3. FIG. 3 is a functional block diagram showing the processing for the revolution speed control of the engine, the electric motor and the hydraulic pump by the vehicle body controller, etc. constituting the first embodiment of the hybrid-driven hydraulic work machine in accordance with the present invention.

The revolution speed control system includes target engine revolution speed calculation means 11a, engine load calculation means 11b, electric motor power running calculation means 11c, hydraulic pump absorption torque calculation means 11d and a storage device 11e (which are components of the vehicle body controller 11) and engine control means 21a (which is a component of the engine controller 21). As will be explained later, the storage device 11e has stored a target engine revolution speed (see FIG. 6) as an appropriate engine revolution speed capable of dealing with conditions of use like those of a work machine.

The target engine revolution speed calculation means 11a defines the target engine revolution speed as a revolution speed at a torque point where the fuel efficiency is relatively high in consideration of fuel efficiency characteristics of the engine 7 with respect to the revolution speed and torque characteristics of the engine 7. The target engine revolution speed calculation means 11a reads out a target engine revolution speed stored in the storage device 11e, sets the target engine revolution speed as the target revolution speed of the engine 7, and outputs the value of the target revolution speed to the electric motor power running calculation means 11c and the hydraulic pump absorption torque calculation means 11d and to the engine control means 21a of the engine controller 21. The method of setting the target engine revolution speed will be explained later.

Although not illustrated, the vehicle body controller 11 may further include a separate target revolution speed calculation unit which receives the command signal from the engine control dial 20 and calculates the target revolution speed based on the command signal. In this case, the work machine may be equipped with a mode switch so as to allow the operator to select one from the target engine revolution speed set by the separate target revolution speed calculation unit and the target engine revolution speed calculated by the target engine revolution speed calculation means 11a based on the command signal inputted from the engine control dial 20.

The engine control means 21a of the engine controller 21 executes control to maintain the target revolution speed of the engine 7 by calculating the deviation between the target engine revolution speed inputted from the target engine revolution speed calculation means 11a and the actual revolution speed of the engine 7 detected by the revolution sensor 23, calculating a target fuel injection quantity corresponding to the deviation, and outputting a control signal corresponding to the target fuel injection quantity to the electronic governor 7a. Further, since the calculated target fuel injection quantity is an amount corresponding to engine torque that is necessary for rotating the revolution system at the target engine revolution speed, the engine control means 21a calculates the engine torque from the target fuel injection quantity and outputs a signal representing the calculated engine torque to the engine load calculation means 11b.

The engine load calculation means 11b calculates the load on the engine 7 based on the engine torque signal inputted from the engine control means 21a. The method for the calculation will be explained later.

The electric motor power running calculation means 11c calculates the deviation between the target engine revolution speed inputted from the target engine revolution speed calculation means 11a and the actual revolution speed of the engine 7 detected by the revolution sensor 23 and calculates torque capable of rotating the revolution system at the target engine revolution speed based on the calculated deviation and the load on the engine 7 inputted from the engine load calculation means 11b. Then, according to the calculated torque, the electric motor power running calculation means 11c calculates power-running electric power as a command for the electric assist motor 10, sends a control signal to the inverter 12, and thereby performs the power running control on the electric assist motor 10. Specifically, when the load on the engine 7 is high and the revolution speed of the engine 7 is lower than the target engine revolution speed, the electric motor power running calculation means 11c makes the electric assist motor 10 perform the power running and assist the engine 7 (generate torque in the rotational direction of the engine 7). The assistance is continued until the revolution speed reaches the target engine revolution speed unless the load on the engine 7 drops.

The hydraulic pump absorption torque calculation means 11d calculates the deviation between the target engine revolution speed inputted from the target engine revolution speed calculation means 11a and the actual revolution speed of the engine 7 detected by the revolution sensor 23 and calculates the torque capable of rotating the revolution system at the target engine revolution speed based on the calculated deviation and the load on the engine 7 inputted from the engine load calculation means 11b. Then, according to the calculated torque, the hydraulic pump absorption torque calculation means 11d calculates a setup value of the maximum absorption torque of the hydraulic pump 6, sends a control signal to the regulator 6a, and thereby performs reduction control on the absorption torque of the hydraulic pump 6. Specifically, when the load on the engine 7 is high and the revolution speed of the engine 7 is lower than the target engine revolution speed, the hydraulic pump absorption torque calculation means 11d increases the revolution speed by reducing the absorption torque of the hydraulic pump 6. The reduction of the absorption torque is continued until the revolution speed reaches the target engine revolution speed unless the load on the engine 7 drops.

Details of the control methods of the electric motor power running calculation means 11c and the hydraulic pump absorption torque calculation means 11d will be described later.

Figure 4:
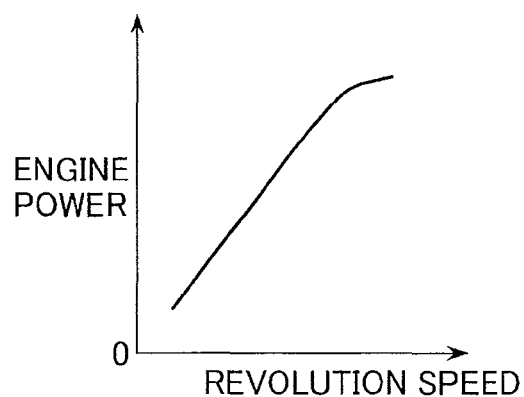
FIG. 4 is a characteristic diagram showing an engine power characteristic according to the vehicle body controller constituting the first embodiment of the hybrid-driven hydraulic work machine in accordance with the present invention.
Figure 5:
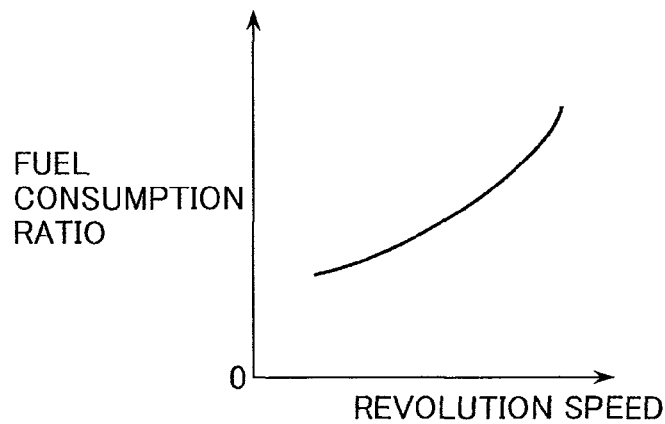
FIG. 5 is a characteristic diagram showing a fuel consumption ratio characteristic according to the vehicle body controller constituting the first embodiment of the hybrid-driven hydraulic work machine in accordance with the present invention.
Figure 6:
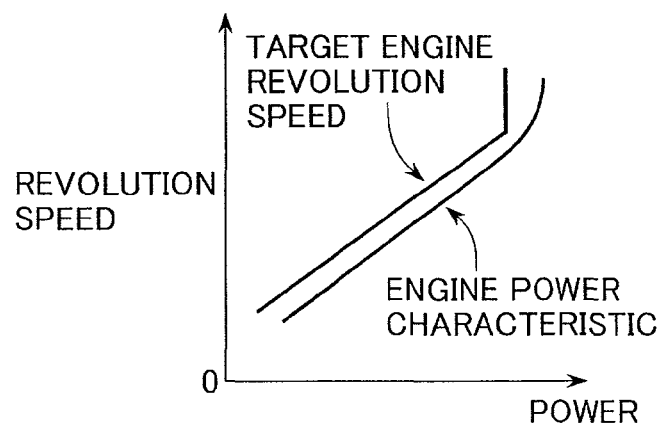
FIG. 6 is a characteristic diagram showing a target engine revolution speed characteristic according to the vehicle body controller constituting the first embodiment of the hybrid-driven hydraulic work machine in accordance with the present invention.

A method for determining the target engine revolution speed will be explained below referring to FIGS. 4-6. FIG. 4 is a characteristic diagram showing an engine power characteristic according to the vehicle body controller constituting the first embodiment of the hybrid-driven hydraulic work machine in accordance with the present invention. FIG. 5 is a characteristic diagram showing a fuel consumption ratio characteristic according to the vehicle body controller constituting the first embodiment of the hybrid-driven hydraulic work machine in accordance with the present invention. FIG. 6 is a characteristic diagram showing a target engine revolution speed characteristic according to the vehicle body controller constituting the first embodiment of the hybrid-driven hydraulic work machine in accordance with the present invention.

The engine 7 employed for a work machine generally has a characteristic like the one shown in FIG. 4, in which the power that can be generated by the engine 7 increases with the increase in the revolution speed. On the other hand, the fuel consumption ratio deteriorates (increases) with the increase in the revolution speed as shown in FIG. 5 since the loss due to the drag of rotating parts such as the hydraulic pump 6 and the electric assist motor 10 increases with the increase in the revolution speed. Incidentally, the "fuel consumption ratio" means the ratio of the amount of the fuel consumed by the engine 7 to the work done by the hydraulic pump 6 when no torque is generated by the electric assist motor 10.

In order for the work machine to operate at a constant engine revolution speed, the engine 7 is required to secure (maintain) a revolution speed that is higher than or equal to a revolution speed at which the engine 7 can generate power sufficient for driving the hydraulic pump 6. Further, in consideration of fuel efficiency, the target engine revolution speed is desired to be set at the lowest revolution speed within a revolution speed range in which the power sufficient for driving the hydraulic pump 6 can be generated. In reality, in order to deal with various conditions of use of the work machine, a characteristic diagram like the one shown in FIG. 6, in which the target engine revolution speed is determined in consideration of a certain margin with respect to the power characteristic required of the engine 7 (power characteristic of an ideal engine 7), is used. The characteristic diagram is prestored in the storage device 11e.

Figure 7:
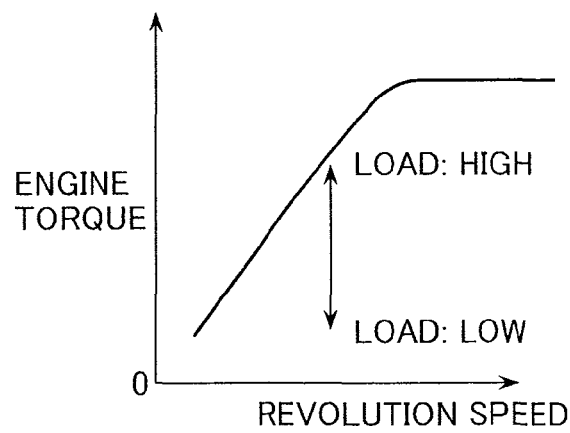
FIG. 7 is a characteristic diagram for explaining engine load calculation means of the vehicle body controller constituting the first embodiment of the hybrid-driven hydraulic work machine in accordance with the present invention.

The method employed by the engine load calculation means 11b for calculating the load on the engine 7 based on the engine torque signal inputted from the engine control means 21a will be explained below referring to FIG. 7. FIG. 7 is a characteristic diagram for explaining the engine load calculation means of the vehicle body controller constituting the first embodiment of the hybrid-driven hydraulic work machine in accordance with the present invention.

While the maximum torque which can be generated by the engine 7 varies depending on the revolution speed as shown in FIG. 7, the maximum torque at each revolution speed is uniformly defined as 100%. On the other hand, no fuel is injected when the revolution speed exceeds the target engine revolution speed, and thus the torque in such cases is defined as 0%. The engine load is calculated based on the fuel injection quantity by using the linear interpolation between 0% and 100%. When the engine load is 100%, it means that the engine 7 is generating the maximum torque at its revolution speed.

Figure 8:
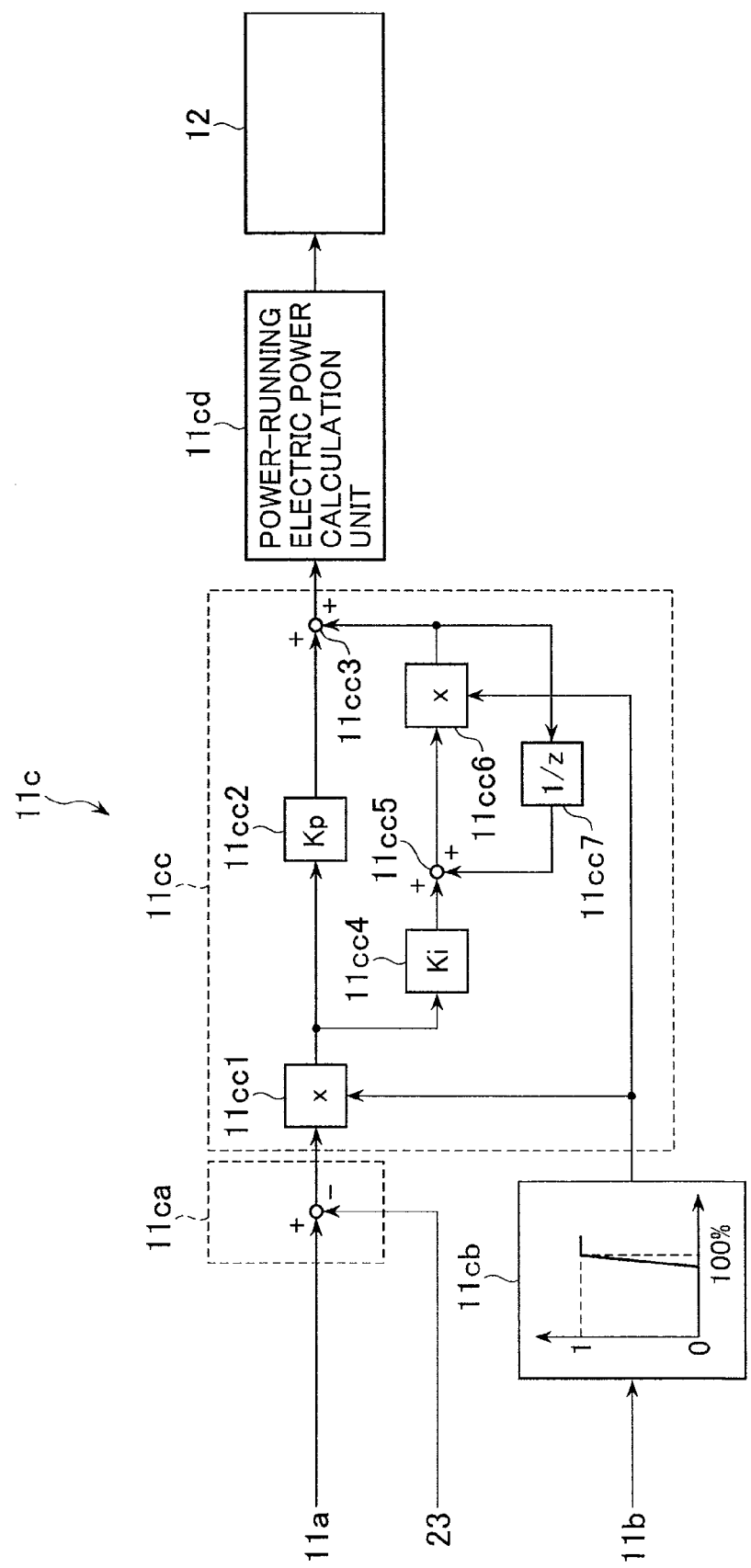
FIG. 8 is a block diagram showing the processing by electric motor power running calculation means of the vehicle body controller constituting the first embodiment of the hybrid-driven hydraulic work machine in accordance with the present invention.
Figure 9:
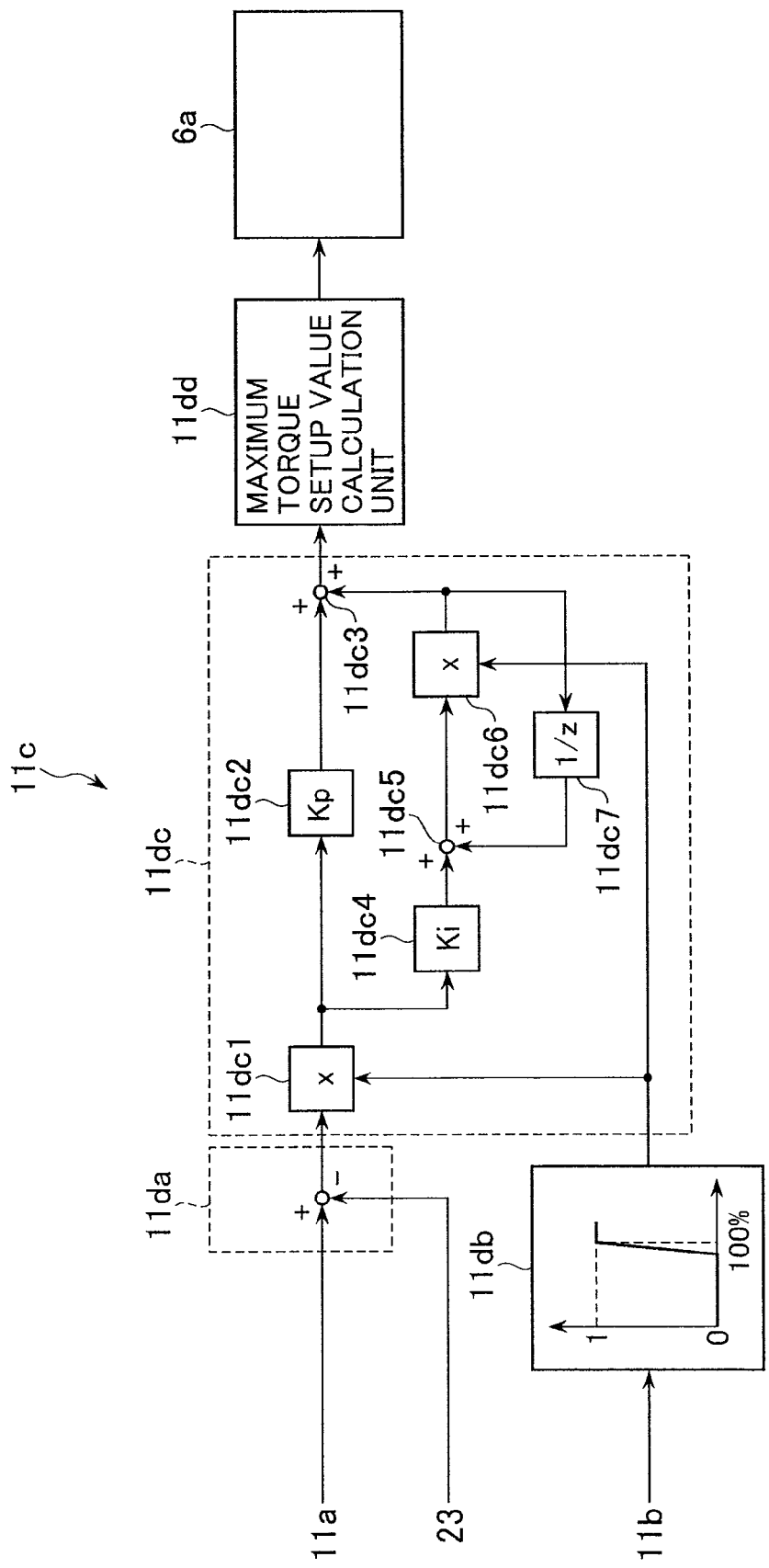
FIG. 9 is a block diagram showing the processing by hydraulic pump absorption torque calculation means of the vehicle body controller constituting the first embodiment of the hybrid-driven hydraulic work machine in accordance with the present invention.

Next, the details of the control methods of the electric motor power running calculation means 11c and the hydraulic pump absorption torque calculation means 11d will be described below referring to FIGS. 8 and 9. FIG. 8 is a block diagram showing the processing by the electric motor power running calculation means of the vehicle body controller constituting the first embodiment of the hybrid-driven hydraulic work machine in accordance with the present invention. FIG. 9 is a block diagram showing the processing by the hydraulic pump absorption torque calculation means of the vehicle body controller constituting the first embodiment of the hybrid-driven hydraulic work machine in accordance with the present invention.

The electric motor power running calculation means 11c shown in FIG. 8 includes an engine revolution speed deviation calculation unit 11ca, an engine load judgment unit 11cb, a proportional-integral control calculation unit 11cc, and a power-running electric power calculation unit 11cd. The circuit formed by the engine revolution speed deviation calculation unit 11ca, the engine load judgment unit 11cb and the proportional-integral control calculation unit 11cc is a servo system which outputs an electric motor power running torque command for making the revolution speed of the revolution system approach the target engine revolution speed. The servo system is made up of proportional control of a proportional gain Kp and integral control of an integral gain Ki. The power-running electric power calculation unit 11cd calculates the power-running electric power as a command for the electric assist motor 10 based on the electric motor power running torque command and outputs the control signal to the inverter 12.

First, the engine revolution speed deviation calculation unit 11ca calculates an engine revolution speed deviation as the difference between the target engine revolution speed and the actual revolution speed. The target engine revolution speed is inputted from the target engine revolution speed calculation means 11a. The actual revolution speed is a detection value inputted from the revolution sensor 23. The output of the engine revolution speed deviation calculation unit 11ca is inputted to one input terminal of a first multiplier of the proportional-integral control calculation unit 11cd.

The engine load judgment unit 11cb receives an engine load signal from the engine load calculation means 11b, inputs the received signal to its function generator, and outputs a preset function signal. Specifically, the engine load judgment unit 11cb outputs a signal 0 when the engine load is 99% or lower and outputs a signal 1 when the engine load is 100% or higher, for example. The output signal of the engine load judgment unit 11cb is inputted to the other input terminal of the first multiplier 11cc1 of the proportional-integral control calculation unit 11cc and to the other (second) input terminal of a second multiplier 11cc6 which will be explained later.

The proportional-integral control calculation unit 11cc includes the first multiplier 11cc1, a proportional gain calculator 11cc2, a first adder 11cc3, an integral gain calculator 11cc4, a second adder 11cc5, the second multiplier 11cc6, and an integral calculator 11cc7.

The first multiplier 11cc1, receiving the output of the engine revolution speed deviation calculation unit 11ca via the one input terminal and the output of the engine load judgment unit 11cb via the other input terminal, outputs a value obtained by multiplying the two input values. Therefore, when the engine load is not substantially 100% (i.e., when the engine is not outputting the maximum torque at the revolution speed of that time), the output of the first multiplier 11cc1 is 0 since the input from the engine load judgment unit 11cb is 0. When the engine is outputting the maximum torque at the revolution speed of that time, the first multiplier 11cc1 outputs the output value of the engine revolution speed deviation calculation unit 11ca since the input from the engine load judgment unit 11cb is 1. The output of the first multiplier 11cc1 is inputted to the proportional gain calculator 11cc2 and the integral gain calculator 11cc4.

The proportional gain calculator 11cc2 multiplies the output of the first multiplier 11cc1 (as the input signal) with a preset value of the proportional control gain Kp and outputs the product to one input terminal of the first adder 11cc3.

The first adder 11cc3, receiving the output of the proportional gain calculator 11cc2 via the one input terminal and the output of the second multiplier 11cc6 via the other input terminal, outputs the sum of the two input values to the power-running electric power calculation unit 11cd as the electric motor power running torque command.

The integral gain calculator 11cc4 multiplies the output of the first multiplier 11cc1 (as the input signal) with a preset value of the integral control gain Ki and outputs the product to one input terminal of the second adder 11cc5.

The second adder 11cc5, receiving the output of the integral gain calculator 11cc4 via the one input terminal and the output of the integral calculator 11cc7 via the other input terminal, outputs the sum of the two input values to the second multiplier 11cc6.

The second multiplier 11cc6, receiving the output of the second adder 11cc5 via one input terminal and the output of the engine load judgment unit 11cb via the other input terminal, outputs a value obtained by multiplying the two input values. The output of the second multiplier 11cc6 is inputted to the other input terminal of the first adder 11cc3 and to the integral calculator 11cc7.

The integral calculator 11cc7 receives the output of the second multiplier 11cc6 and outputs the input signal to the other input terminal of the second adder 11cc5. The calculation (processing) by the integral calculator 11cc7 is to output the input signal by delaying it for a time as a control cycle. The integral calculation is implemented by feeding back the output of the second adder 11cc5 via the integral calculator 11cc7.

Incidentally, because the second multiplier 11cc6 is provided between the second adder 11cc5 and the integral calculator 11cc7, when the engine is outputting the maximum torque at the revolution speed of that time, the second multiplier 11cc6 outputs the output value of the second adder 11cc5 since the input from the engine load judgment unit 11cb is 1. When the engine load is not substantially 100% (i.e., when the engine is not outputting the maximum torque at the revolution speed of that time), the output of the second multiplier 11cc6 is 0 since the input from the engine load judgment unit 11cb is 0. Therefore, when the engine is not outputting the maximum torque at the revolution speed of that time, the calculation of the integral control is not carried out and the integral is also reset to 0.

The power-running electric power calculation unit 11cd receives the electric motor power running torque command outputted from the proportional-integral control calculation unit 11cc, calculates the power-running electric power as the command for the electric assist motor 10, sends the control signal to the inverter 12, and thereby performs the power running control on the electric assist motor 10.

Next, the hydraulic pump absorption torque calculation means 11d will be explained referring to FIG. 9. The hydraulic pump absorption torque calculation means 11d includes an engine revolution speed deviation calculation unit 11da, an engine load judgment unit 11db, a proportional-integral control calculation unit 11dc, and a maximum torque setup value calculation unit 11dd. The circuit formed by the engine revolution speed deviation calculation unit 11da, the engine load judgment unit 11db and the proportional-integral control calculation unit 11dc is a servo system which outputs a torque command for making the revolution speed of the revolution system approach the target engine revolution speed. The servo system is made up of proportional control of a proportional gain Kp and integral control of an integral gain Ki. The maximum torque setup value calculation unit 11dd calculates the setup value of the maximum absorption torque (as a command for the hydraulic pump 6) according to the torque command and outputs the control signal to the regulator 6a.

The engine revolution speed deviation calculation unit 11da, the engine load judgment unit 11db and the proportional-integral control calculation unit 11dc are configured in the same way as the corresponding components of the electric motor power running calculation means 11c, and thus repeated explanation thereof is omitted.

The maximum torque setup value calculation unit 11dd receives the torque command outputted from the proportional-integral control calculation unit 11dc, calculates the setup value of the maximum absorption torque of the hydraulic pump 6 according to the torque command, sends the control signal to the regulator 6a, and thereby performs the reduction control on the absorption torque of the hydraulic pump 6. Specifically, a control signal obtained by subtracting the inputted torque command from the preset maximum torque setup value is outputted to the regulator 6a.

Similarly to the operation of the electric motor power running calculation means 11c explained before, when the engine load is not substantially 100% (i.e., when the engine is not outputting the maximum torque at the revolution speed of that time), the calculation of the proportional and integral control is not carried out and the integral is also reset to 0 since the input from the engine load judgment unit 11db is 0. Therefore, when the engine is not outputting the maximum torque at the revolution speed of that time, the setup value of the absorption torque given to the hydraulic pump 6 remains at the preset maximum torque setup value and the limitation of the absorption torque is not carried out.

Figure 10:
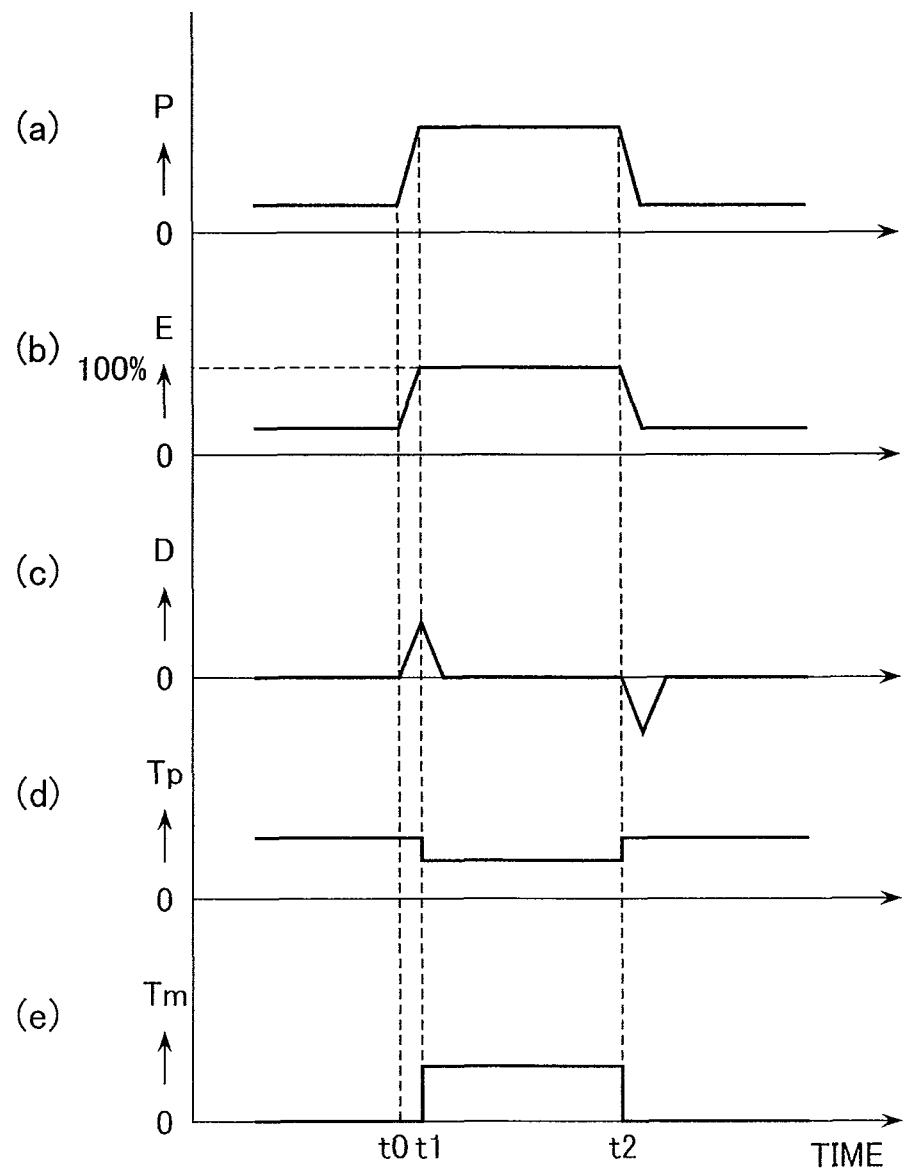
FIG. 10 is a time chart for explaining the operation of the revolution speed control of the engine, the electric motor and the hydraulic pump in the first embodiment of the hybrid-driven hydraulic work machine in accordance with the present invention.

Next, the operation of the above-described first embodiment of the hybrid-driven hydraulic work machine in accordance with the present invention will be explained below with reference to FIG. 10. FIG. 10 is a time chart for explaining the operation of the revolution speed control of the engine, the electric motor and the hydraulic pump in the first embodiment of the hybrid-driven hydraulic work machine in accordance with the present invention. Reference characters in FIG. 10 identical to those in FIGS. 1-9 represent elements identical to the already-explained elements, and thus detailed explanation thereof is omitted for brevity.

In FIG. 10, the horizontal axis represents the time. The vertical axes of the charts (a)-(e) from above represent the load P on the hydraulic pump 6, the load E on the engine 7, the difference D between the target engine revolution speed and the actual revolution speed, the maximum torque setup value Tp of the hydraulic pump 6, and the output torque Tm of the electric assist motor 10. Before the time t0, the load on the hydraulic pump 6 shown in the chart (a) is low and thus the load can be covered by the output of the engine 7 alone. Therefore, the torque assistance by the electric assist motor 10 shown in the chart (e) is 0 and the reduction in the hydraulic pump maximum torque setup value shown in the chart (d) is 0.

The load on the hydraulic pump 6 starts increasing at the time t0. Due to the revolution speed control of the engine 7, the engine torque increases in order to maintain the engine revolution speed. However, the load as the maximum torque is saturated as shown in the chart (b) at the time t1 when the load reaches 100%. Since the load on the hydraulic pump 6 is higher than the power of the engine 7, a revolution speed deviation occurs as shown in the chart (c).

Since the engine load is 100% at the time t1, the electric motor power running calculation means 11c operates according to the signal from the engine load calculation means 11b. Accordingly, torque is generated by the electric assist motor 10 as shown in the chart (e) to assist the torque of the engine 7, and the hydraulic pump absorption torque calculation means 11d operates and reduces the hydraulic pump maximum torque setup value of the regulator 6a as shown in the chart (d). Consequently, the revolution speed deviation shown in the chart (c) decreases.

Between the time t1 and the time t2, each control explained above is in execution. For example, when the engine load shown in the chart (b) decreases and falls below 100%, the operations of the electric motor power running calculation means 11c and the hydraulic pump absorption torque calculation means 11d are canceled by the signal from the engine load calculation means 11b. Accordingly, the torque assistance by the electric assist motor 10 and the reduction of the hydraulic pump maximum torque setup value of the regulator 6a are canceled. Therefore, the output of the engine 7 immediately increases to 100%, and consequently, the engine load is maintained substantially at 100%.

Subsequently, at the time t2, the load on the hydraulic pump 6 starts decreasing as shown in the chart (a). In response to the decrease in the load on the hydraulic pump 6, the engine load decreases as shown in the chart (b). The operations of the electric motor power running calculation means 11c and the hydraulic pump absorption torque calculation means 11d are canceled by the signal from the engine load calculation means 11b. Consequently, the torque assistance by the electric assist motor 10 and the reduction of the hydraulic pump maximum torque setup value of the regulator 6a are canceled, the hydraulic pump maximum torque setup value of the regulator 6a shown in the chart (d) returns to the original value, and the torque of the electric assist motor 10 shown in the chart (e) returns to 0.

As described above, according to this embodiment, the torque of the engine 7 is controlled and fixed approximately at the maximum value at the engine revolution speed even when the electric assist motor 10 assists the engine 7.

By the above-described first embodiment of the hybrid-driven hydraulic work machine in accordance with the present invention, the following effects are achieved: In the hydraulic work machine having the electric assist motor 10 linked to the engine 7 and the hydraulic pump 6 and performing the revolution speed control on the engine 7 and the electric assist motor 10 independently, in response to the exceeding of the load on the hydraulic pump 6 over the maximum torque of the engine 7 at its revolution speed, the electric assist motor 10 assists the engine 7 with the minimum torque that the engine 7 lacks. Therefore, the engine 7 is enabled to continuously generate the maximum torque. Consequently, advantages of the hybrid driving, such as improvement in fuel efficiency, can be achieved to the fullest extent.

Incidentally, while the function (mathematical function) of the engine load judgment unit (11cb, 11db) in this embodiment was explained by using an example in which the output signal equals 1 when the engine load as the input is 100% or higher, the function is not restricted to this example. For example, the function may also be set so that the output signal equals 1 when the engine load is higher than or equal to a prescribed value in the vicinity of 100%.

Second Embodiment

Figure 11:
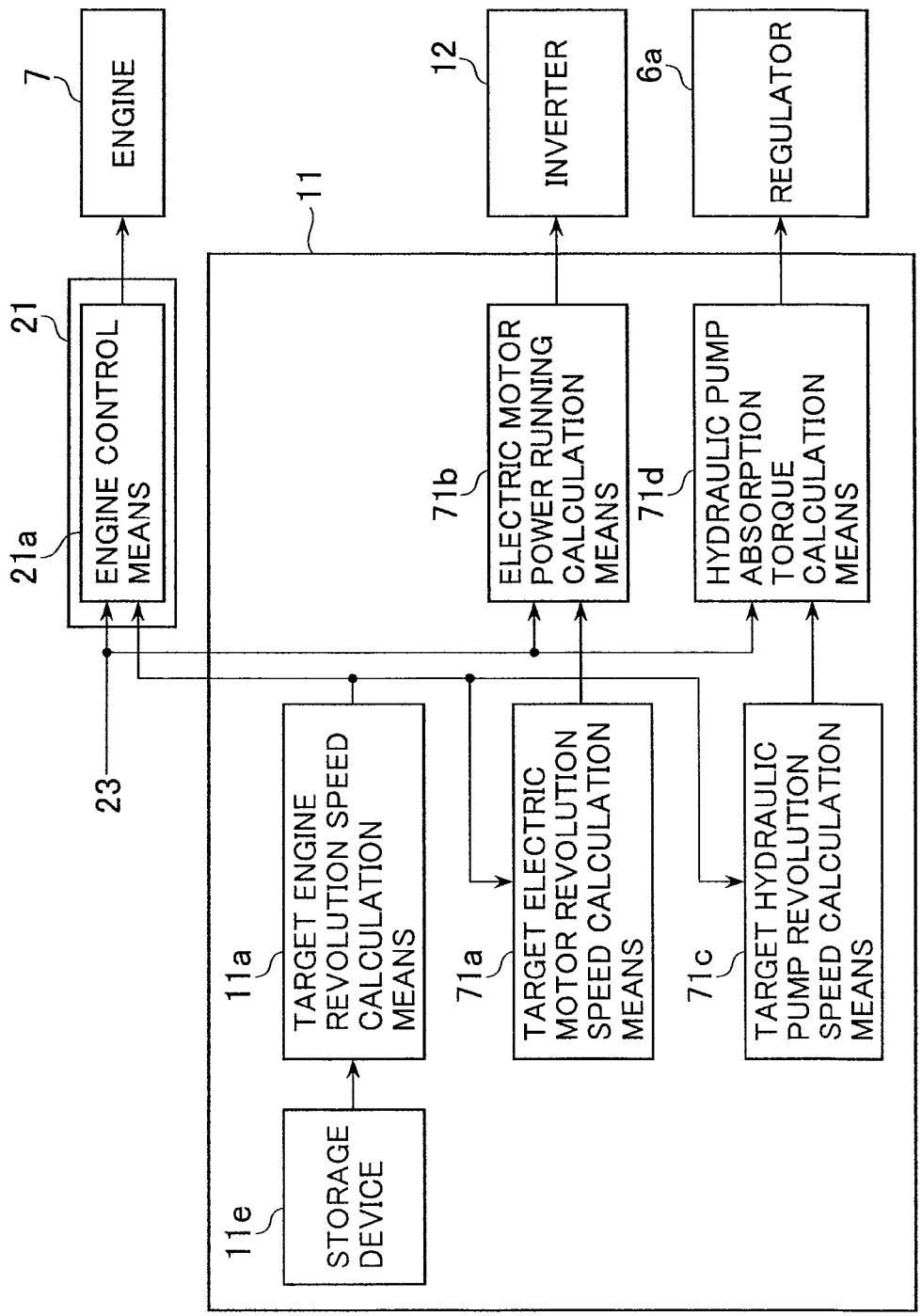
FIG. 11 is a functional block diagram showing the processing for the revolution speed control of the engine, the electric motor and the hydraulic pump by the vehicle body controller, etc. constituting the second embodiment of the hybrid-driven hydraulic work machine in accordance with the present invention.

A second embodiment of the hybrid-driven hydraulic work machine in accordance with the present invention will be described below referring to figures. FIG. 11 is a functional block diagram showing the processing for the revolution speed control of the engine, the electric motor and the hydraulic pump by the vehicle body controller, etc. constituting the second embodiment of the hybrid-driven hydraulic work machine in accordance with the present invention. Reference characters in FIG. 11 identical to those in FIGS. 1-10 represent elements identical to the already-explained elements, and thus detailed explanation thereof is omitted for brevity.

In the first embodiment, the engine 7, the electric assist motor 10 and the hydraulic pump 6 are controlled so that they revolve at the same target engine revolution speed. In this embodiment, the hybrid-driven hydraulic work machine is equipped with target electric motor revolution speed calculation means 71a and target hydraulic pump revolution speed calculation means 71c. The revolution speeds targeted by the electric assist motor 10 and the hydraulic pump 6 are set approximately 50 rpm lower than the revolution speed targeted by the engine 7, for example.

With this configuration, when the load given to the engine 7 is low, the engine 7 revolves substantially at the target engine revolution speed. In this case, the assistance by the electric assist motor 10 and the reduction of the maximum torque setup value of the hydraulic pump 6 are not carried out. In contrast, when the load given to the engine 7 increases and the actual revolution speed of the engine 7 falls 50 rpm or more below the target engine revolution speed, electric motor power running calculation means 71b and hydraulic pump absorption torque calculation means 71d operate and the assistance by the electric assist motor 10 and the reduction of the maximum torque setup value of the hydraulic pump 6 are carried out. During the period in which these calculation means are operating, the actual revolution speed of the engine 7 is below the target engine revolution speed and the engine control means 21a executes control to make the engine 7 generate the maximum torque at its revolution speed.

In FIG. 11, the target electric motor revolution speed calculation means 71a calculates the target revolution speed of the electric assist motor 10 based on the target engine revolution speed inputted from the target engine revolution speed calculation means 11a. In this embodiment, the target revolution speed of the electric assist motor 10 is set at a value 50 rpm lower than the target engine revolution speed.

The electric motor power running calculation means 71b calculates the deviation between the target electric motor revolution speed inputted from the target electric motor revolution speed calculation means 71a and the actual revolution speed of the engine 7 detected by the revolution sensor 23 and calculates torque capable of rotating the revolution system at the target electric motor revolution speed based on the deviation. Then, according to the calculated torque, the electric motor power running calculation means 71b calculates the power-running electric power as a command for the electric assist motor 10, sends the control signal to the inverter 12, and thereby performs the power running control on the electric assist motor 10. The assistance is continued until the revolution speed of the revolution system reaches the target electric motor revolution speed.

The target hydraulic pump revolution speed calculation means 71c calculates the target revolution speed of the hydraulic pump 6 based on the target engine revolution speed inputted from the target engine revolution speed calculation means 11a. In this embodiment, the target revolution speed of the hydraulic pump 6 is set at a value 50 rpm lower than the target engine revolution speed.

The hydraulic pump absorption torque calculation means 71d calculates the deviation between the target hydraulic pump revolution speed inputted from the target hydraulic pump revolution speed calculation means 71c and the actual revolution speed of the engine 7 detected by the revolution sensor 23 and calculates torque capable of rotating the revolution system at the target hydraulic pump revolution speed based on the deviation. Then, according to the calculated torque, the hydraulic pump absorption torque calculation means 71d calculates the setup value of the maximum absorption torque of the hydraulic pump 6, sends the control signal to the regulator 6a, and thereby performs the reduction control on the absorption torque of the hydraulic pump 6. The reduction of the absorption torque is continued until the revolution speed of the revolution system reaches the target hydraulic pump revolution speed.

Figure 12:
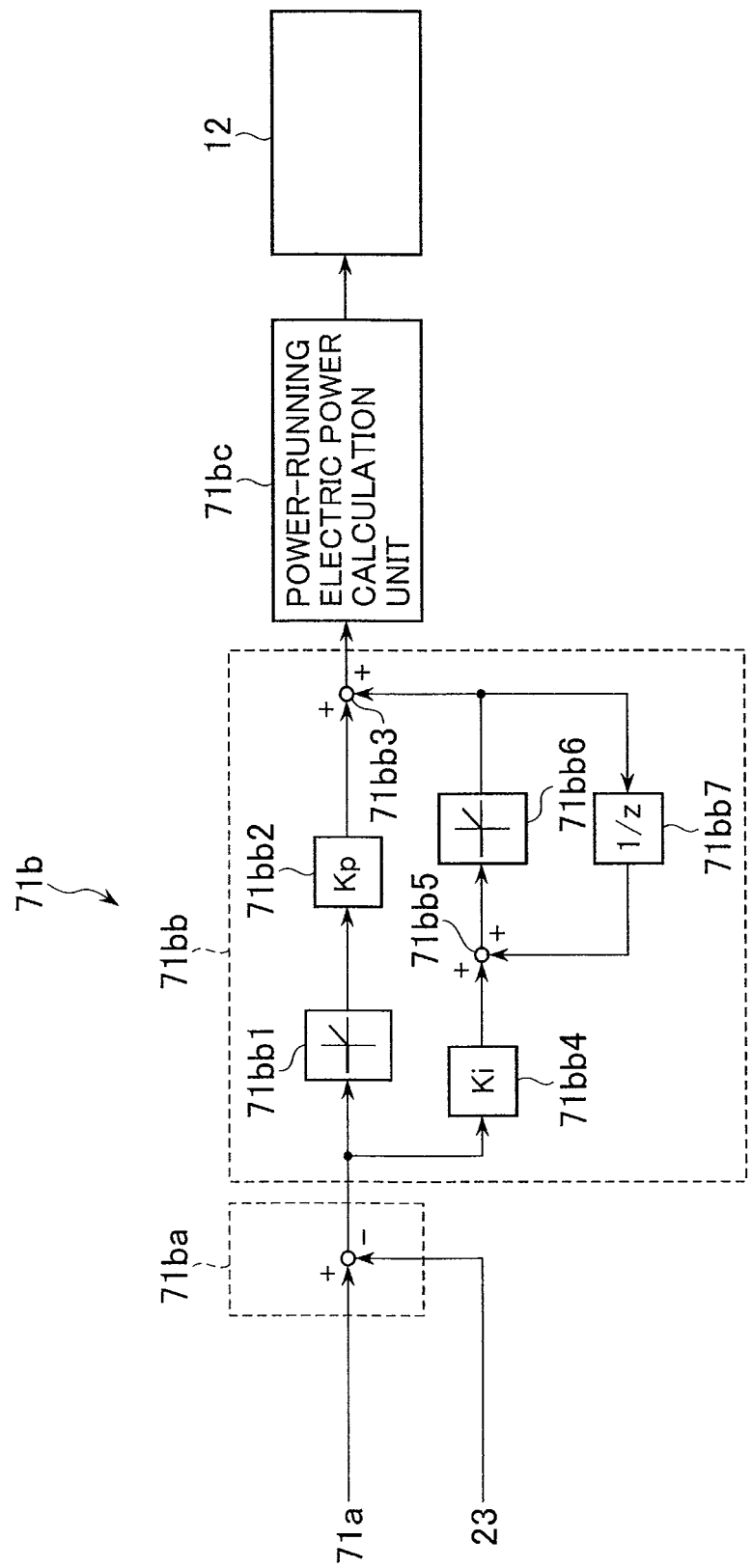
FIG. 12 is a block diagram showing the processing by the electric motor power running calculation means of the vehicle body controller constituting the second embodiment of the hybrid-driven hydraulic work machine in accordance with the present invention.
Figure 13:
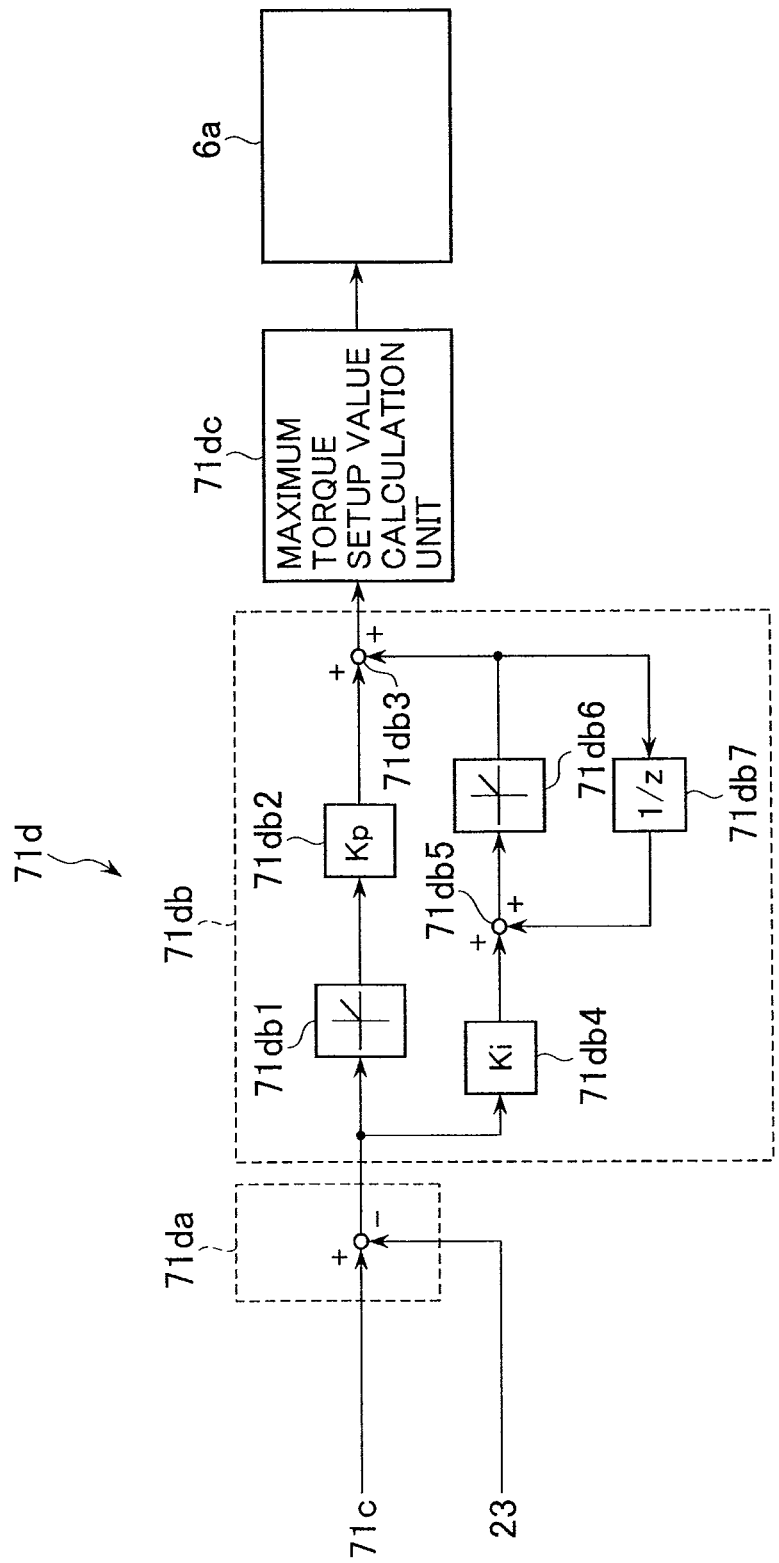
FIG. 13 is a block diagram showing the processing by the hydraulic pump absorption torque calculation means of the vehicle body controller constituting the second embodiment of the hybrid-driven hydraulic work machine in accordance with the present invention.

Next, the details of the control methods of the electric motor power running calculation means 71b and the hydraulic pump absorption torque calculation means 71d will be described below referring to FIGS. 12 and 13. FIG. 12 is a block diagram showing the processing by the electric motor power running calculation means of the vehicle body controller constituting the second embodiment of the hybrid-driven hydraulic work machine in accordance with the present invention. FIG. 13 is a block diagram showing the processing by the hydraulic pump absorption torque calculation means of the vehicle body controller constituting the second embodiment of the hybrid-driven hydraulic work machine in accordance with the present invention.

The electric motor power running calculation means 71b shown in FIG. 12 includes an electric motor revolution speed deviation calculation unit 71ba, a proportional-integral control calculation unit 71bb, and a power-running electric power calculation unit 71bc. The circuit formed by the electric motor revolution speed deviation calculation unit 71ba and the proportional-integral control calculation unit 71*bb* is a servo system which outputs an electric motor power running torque command for making the revolution speed of the revolution system approach the target electric motor revolution speed. The servo system is made up of proportional control of a proportional gain Kp and integral control of an integral gain Ki. The power-running electric power calculation unit 71*cc* calculates the power-running electric power as the command for the electric assist motor 10 based on the electric motor power running torque command and outputs the control signal to the inverter 12.

First, the electric motor revolution speed deviation calculation unit 71*ba* calculates an electric motor revolution speed deviation as the difference between the target electric motor revolution speed and the actual revolution speed. The target electric motor revolution speed is inputted from the target electric motor revolution speed calculation means 71*a*. The actual revolution speed is the detection value inputted from the revolution sensor 23. The output of the electric motor revolution speed deviation calculation unit 71*ba* is inputted to input terminals of a first limiter 71*bb*1 and an integral gain calculator 71*bb*4 of the proportional-integral control calculation unit 71*bb*.

The proportional-integral control calculation unit 71*bb* includes the first limiter 71*bb*1, a proportional gain calculator 71*bb*2, a first adder 71*bb*3, the integral gain calculator 71*bb*4, a second adder 71*bb*5, a second limiter 71*bb*6, and an integral calculator 71*bb*7.

The first limiter 71*bb*1 receives the output of the electric motor revolution speed deviation calculation unit 71*ba* and outputs 0 when the input value is negative. When the input value is positive, the first limiter 71*bb*1 outputs the input value. Therefore, the output of the first limiter 71*bb*1 remains at 0 when the revolution speed of the revolution system does not fall below the target electric motor revolution speed. The output of the first limiter 71*bb*1 is inputted to the proportional gain calculator 71*bb*2.

The proportional gain calculator 71*bb*2 multiplies the output of the first limiter 71*bb*1 (as the input signal) with a preset value of the proportional control gain Kp and outputs the product to one input terminal of the first adder 71*bb*3.

The first adder 71*bb*3, receiving the output of the proportional gain calculator 71*bb*2 via the one input terminal and the output of the second limiter 71*bb*6 via the other input terminal, outputs the sum of the two input values to the power-running electric power calculation unit 71*bc* as the electric motor power running torque command.

The integral gain calculator 71*bb*4 multiplies the output of the electric motor revolution speed deviation calculation unit 71*ba* (as the input signal) with a preset value of the integral control gain Ki and outputs the product to one input terminal of the second adder 71*bb*5.

The second adder 71*bb*5, receiving the output of the integral gain calculator 71*bb*4 via the one input terminal and the output of the integral calculator 71*bb*7 via the other input terminal, outputs the sum of the two input values to the second limiter 71*bb*6.

The second limiter 71*bb*6 receives the output of the second adder 71*bb*5 and outputs 0 when the input value is negative. When the input value is positive, the second limiter 71*bb*6 outputs the input value. The output of the second limiter 71*bb*6 is inputted to the other input terminal of the first adder 71*bb*3 and to the integral calculator 71*bb*7.

The integral calculator 71*bb*7 receives the output of the second limiter 71*bb*6 and outputs the input signal to the other input terminal of the second adder 71*bb*5. The calculation (processing) by the integral calculator 71*bb*7 is to output the input signal by delaying it for a time as a control cycle. The integral calculation is implemented by feeding back the output of the second adder 71*bb*5 via the integral calculator 71*bb*7.

The power-running electric power calculation unit 71*bc* receives the electric motor power running torque command outputted from the proportional-integral control calculation unit 71*bb*, calculates the power-running electric power as the command for the electric assist motor 10, sends the control signal to the inverter 12, and thereby performs the power running control on the electric assist motor 10.

Next, the hydraulic pump absorption torque calculation means 71*d* will be explained referring to FIG. 13. The hydraulic pump absorption torque calculation means 71*d* includes a hydraulic pump revolution speed deviation calculation unit 71*da*, a proportional-integral control calculation unit 71*db*, and a maximum torque setup value calculation unit 71*dc*. The circuit formed by the hydraulic pump revolution speed deviation calculation unit 71*da* and the proportional-integral control calculation unit 71*db* is a servo system which outputs a torque command for making the revolution speed of the revolution system approach the target hydraulic pump revolution speed. The servo system is made up of proportional control of a proportional gain Kp and integral control of an integral gain Ki. The maximum torque setup value calculation unit 71*dc* calculates the setup value of the maximum absorption torque (as a command for the hydraulic pump 6) according to the torque command and outputs the control signal to the regulator 6*a*.

The hydraulic pump revolution speed deviation calculation unit 71*da* and the proportional-integral control calculation unit 71*db* are configured in the same way as the corresponding components of the electric motor power running calculation means 71*b*, and thus repeated explanation thereof is omitted.

The maximum torque setup value calculation unit 71*dc* receives the torque command outputted from the proportional-integral control calculation unit 71*db*, calculates the setup value of the maximum absorption torque of the hydraulic pump 6 according to the torque command, sends the control signal to the regulator 6*a*, and thereby performs the reduction control on the absorption torque of the hydraulic pump 6. Specifically, a control signal obtained by subtracting the inputted torque command from the preset maximum torque setup value is outputted to the regulator 6*a*.

Similarly to the operation of the electric motor power running calculation means 71*b* explained before, when the revolution speed of the revolution system is higher than the target hydraulic pump revolution speed, the outputs of a first limiter 71*db*1 and a second limiter 71*db*6 are limited to 0, and thus the calculation of the proportional and integral control is not executed. Therefore, when the revolution speed of the revolution system is higher than the target hydraulic pump revolution speed, the absorption torque setup value given to the hydraulic pump 6 remains at the preset maximum torque setup value and the limitation of the absorption torque is not carried out.

In this embodiment, when the revolution speed of the revolution system decreases below the target engine revolution speed (due to the increase in the load given to the engine 7) and further falls below the target electric motor revolution speed or the target hydraulic pump revolution speed, the assistance by the electric assist motor 10 or the reduction of the absorption torque of the hydraulic pump 6 is executed so as to restore the revolution speed of the revolution system to the target electric motor revolution speed or the target hydraulic pump revolution speed.

Figure 14:
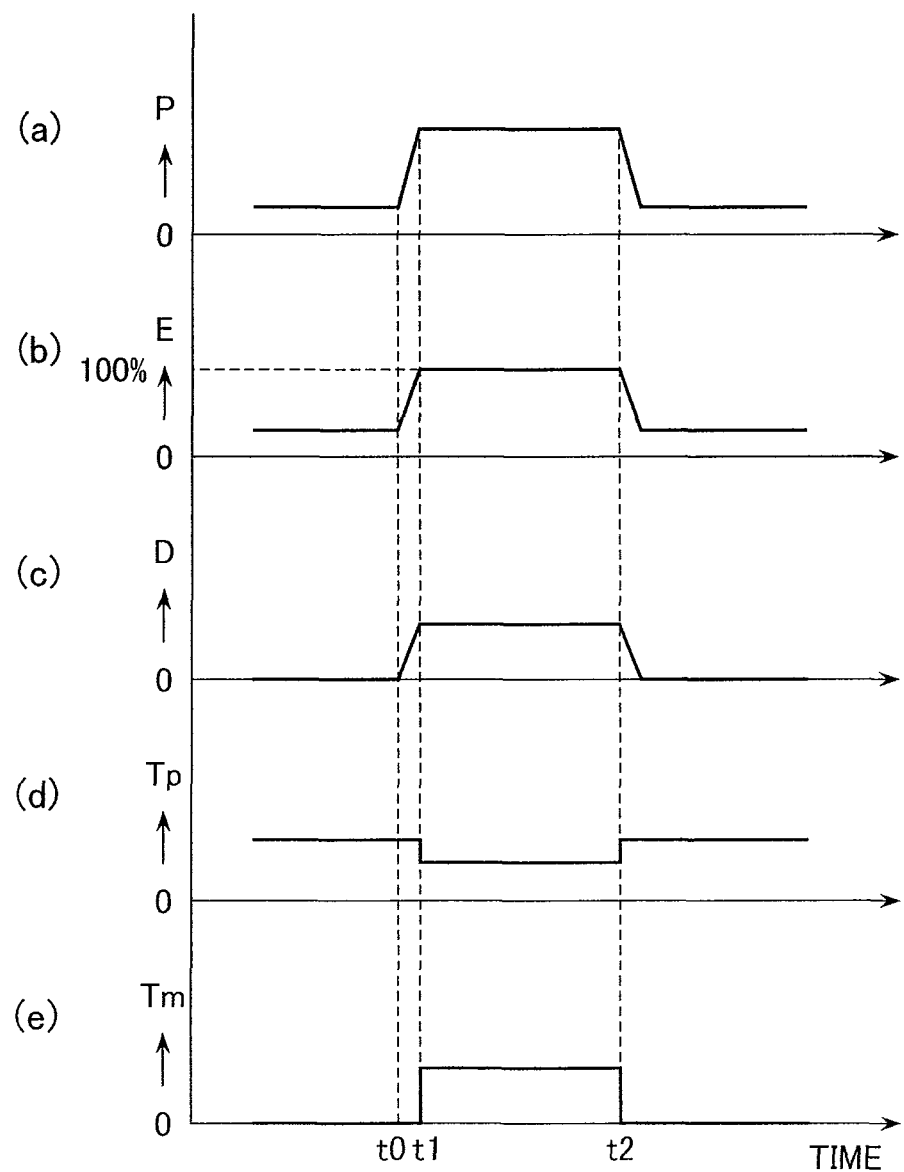
FIG. 14 is a time chart for explaining the operation of the revolution speed control of the engine, the electric motor and the hydraulic pump in the second embodiment of the hybrid-driven hydraulic work machine in accordance with the present invention.

Next, the operation of the above-described second embodiment of the hybrid-driven hydraulic work machine in accordance with the present invention will be explained below with reference to FIG. 14. FIG. 14 is a time chart for explaining the operation of the revolution speed control of the engine, the electric motor and the hydraulic pump in the second embodiment of the hybrid-driven hydraulic work machine in accordance with the present invention. Reference characters in FIG. 14 identical to those in FIGS. 1-13 represent elements identical to the already-explained elements, and thus detailed explanation thereof is omitted for brevity.

In FIG. 14, the horizontal axis represents the time. The vertical axes of the charts (a)-(e) from above represent the load P on the hydraulic pump 6, the load E on the engine 7, the difference D between the target engine revolution speed and the actual revolution speed, the maximum torque setup value Tp of the hydraulic pump 6, and the output torque Tm of the electric assist motor 10.

Before the time t0, the load on the hydraulic pump 6 shown in the chart (a) is low and thus the load can be covered by the output of the engine 7 alone. Therefore, the torque assistance by the electric assist motor 10 shown in the chart (e) is 0 and the reduction in the hydraulic pump maximum torque setup value the regulator 6a shown in the chart (d) is 0.

The load on the hydraulic pump 6 starts increasing at the time t0. Due to the revolution speed control of the engine 7, the engine torque increases in order to maintain the engine revolution speed. However, the load as the maximum torque is saturated as shown in the chart (b) at the time t1 when the load reaches 100%. Since the load on the hydraulic pump 6 is higher than the power of the engine 7, a revolution speed deviation occurs as shown in the chart (c).

At the time t1, the revolution speed of the revolution system becomes lower than the target electric motor revolution speed and the target hydraulic pump revolution speed and thus the electric motor power running calculation means 71b operates. Accordingly, torque is generated by the electric assist motor 10 as shown in the chart (e) to assist the torque of the engine 7, and the hydraulic pump absorption torque calculation means 71d operates and reduces the hydraulic pump maximum torque setup value of the regulator 6a as shown in the chart (d).

Between the time t1 and the time t2, the revolution speed of the revolution system becomes lower than the target engine revolution speed. Therefore, the engine load is maintained at 100% by the revolution speed control of the engine 7 by the engine control means 21a. The revolution speed of the revolution system is controlled at the target electric motor revolution speed lower than the target engine revolution speed by the revolution speed control of the electric assist motor 10 by the electric motor power running calculation means 71b. Further, depending on the target hydraulic pump revolution speed inputted from the hydraulic pump absorption torque calculation means 71d, the reduction control of the hydraulic pump maximum torque setup value of the regulator 6a is carried out.

Subsequently, at the time t2, the load on the hydraulic pump 6 starts decreasing as shown in the chart (a). In response to the decrease in the load on the hydraulic pump 6, the engine load decreases as shown in the chart (b) and the revolution speed deviation shown in the chart (c) also decreases. As a result, the revolution speed of the revolution system becomes higher than or equal to the target electric motor revolution speed and the target hydraulic pump revolution speed. Therefore, the operations of the electric motor power running calculation means 71b and the hydraulic pump absorption torque calculation means 71d are canceled, the torque assistance by the electric assist motor 10 and the reduction of the hydraulic pump maximum torque setup value of the regulator 6a are canceled, the hydraulic pump maximum torque setup value of the regulator 6a shown in the chart (d) returns to the original value, and the torque of the electric assist motor 10 shown in the chart (e) returns to 0.

As described above, according to this embodiment, the torque of the engine 7 is controlled and fixed approximately at the maximum value at the revolution speed even when the electric assist motor 10 assists the engine 7.

By the above-described second embodiment of the hybrid-driven hydraulic work machine in accordance with the present invention, effects similar to the aforementioned effects of the first embodiment can be achieved.

Incidentally, while the vehicle body controller 11 includes both the electric motor power running calculation means (11c or 71b) and the hydraulic pump absorption torque calculation means (11d or 71d) in the above explanation of the embodiments of the present invention, the configuration of the vehicle body controller 11 is not restricted to these examples. For example, the vehicle body controller 11 may be configured to include one of the electric motor power running calculation means (11c or 71b) and the hydraulic pump absorption torque calculation means (11d or 71d).

Further, while the vehicle body controller 11 controls and changes the setup value of the maximum torque of the regulator 6a in the examples of the reduction of the hydraulic pump absorption torque in the above embodiments of the present invention, the control by the vehicle body controller 11 is not restricted to these examples. The vehicle body controller 11 may also be configured to directly control the regulator 6a.

DESCRIPTION OF REFERENCE CHARACTERS

3a Boom cylinder
3b Arm cylinder
3c Bucket cylinder
4a, 4b Control lever device
5a-5c, 5e, 5f Directional control valve
6 Hydraulic pump
6a Regulator
7 Engine
7a Electronic governor
10 Electric assist motor
11 Vehicle body controller
11a Target engine revolution speed calculation means
11b Engine load calculation means
11c Electric motor power running calculation means
11d Hydraulic pump absorption torque calculation means
11e Storage device
11e Vehicle body controller
11ca Engine revolution speed deviation calculation unit
11cb Engine load judgment unit
11cc Proportional-integral control calculation unit
11cd Power-running electric power calculation unit
11dd Maximum torque setup value calculation unit
12, 13 Inverter
15 Battery
16 Swing electric motor
21 Engine controller
21a Engine control means
23 Revolution sensor
71a Target electric motor revolution speed calculation means
71b Electric motor power running calculation means
71c Target hydraulic pump revolution speed calculation means
71d Hydraulic pump absorption torque calculation means

The invention claimed is:

1. A hybrid-driven hydraulic work machine comprising an engine (7), a hydraulic pump (6) of the variable displacement type which is driven and rotated by the engine (7), an electric assist motor (10) which is linked to the engine (7) and the hydraulic pump (6), a plurality of actuators (3a-3f) which are driven by hydraulic fluid delivered from the hydraulic pump (6), and a plurality of operation devices (4a, 4b) having operation members and outputting operation signals corresponding to operations on the operation members to cause the actuators to operate, wherein the hybrid-driven hydraulic work machine comprises:
   revolution speed detection means (23) which detects revolution speed of the engine (7);
   a storage device (11e) which has stored a preset engine setup revolution speed of the engine (7);
   target engine revolution speed calculation means (11a) which sets a target revolution speed of the engine (7) at the engine setup revolution speed stored in the storage device (11e);
   engine control means (21a) which controls the revolution speed of the engine (7) based on the target revolution speed of the engine (7);
   engine load calculation means (11b) which calculates an engine load based on an engine torque signal from the engine control means (21a); and
   at least one selected from the following:
      electric motor power running calculation means (11c) which calculates a differential revolution speed between the target engine revolution speed and the revolution speed of the engine and performs power running control on the electric assist motor (10) depending on the differential revolution speed when the engine load is a prescribed value or higher; and
      hydraulic pump absorption torque calculation means (11d) which performs reduction control on absorption torque of the hydraulic pump (6) depending on the differential revolution speed when the engine load is a prescribed value or higher.

2. A hybrid-driven hydraulic work machine comprising an engine (7), a hydraulic pump (6) of the variable displacement type which is driven and rotated by the engine (7), an electric assist motor (10) which is linked to the engine (7) and the hydraulic pump (6), a plurality of actuators (3a-3f) which are driven by hydraulic fluid delivered from the hydraulic pump (6), and a plurality of operation devices (4a, 4b) having operation members and outputting operation signals corresponding to operations on the operation members to cause the actuators to operate, wherein the hybrid-driven hydraulic work machine comprises:
   revolution speed detection means (23) which detects revolution speed of the engine (7);
   a storage device (11e) which has stored a preset engine setup revolution speed of the engine (7);
   target engine revolution speed calculation means (11a) which sets a target revolution speed of the engine (7) at the engine setup revolution speed stored in the storage device (11e);
   engine control means (21a) which controls the revolution speed of the engine (7) based on the target revolution speed of the engine (7); and
   at least one selected from the following:
      target electric motor revolution speed calculation means (71a) which sets a particular revolution speed within the target revolution speed of the engine (7) set by the target engine revolution speed calculation means (11a) as a target revolution speed of the electric assist motor (10) and electric motor power running calculation means (71b) which calculates a differential revolution speed between the target electric motor revolution speed and the revolution speed of the engine (7) and performs power running control on the electric assist motor (10) depending on the differential revolution speed when the revolution speed of the engine (7) has fallen below the target revolution speed of the electric assist motor (10); and
      target hydraulic pump revolution speed calculation means (71c) which sets a particular revolution speed within the target revolution speed of the engine (7) set by the target engine revolution speed calculation means (11a) as a target revolution speed of the hydraulic pump (6) and hydraulic pump absorption torque calculation means (71d) which calculates a differential revolution speed between the target hydraulic pump revolution speed and the revolution speed of the engine (7) and performs reduction control on absorption torque of the hydraulic pump (6) depending on the differential revolution speed when the revolution speed of the engine (7) has fallen below the target revolution speed of the hydraulic pump (6).

3. The hybrid-driven hydraulic work machine according to claim 1, wherein when the value of the engine load calculated by the engine load calculation means (11b) falls below a maximum value at the revolution speed of the engine (7) or a prescribed value in the vicinity of the maximum value, at least one selected from the following is executed:
   cancellation of the power running control of the electric assist motor (10) by the electric motor power running calculation means (11c); and
   cancellation of the reduction control of the absorption torque of the hydraulic pump (6) by the hydraulic pump absorption torque calculation means (11d).

4. The hybrid-driven hydraulic work machine according to claim 2, wherein at least one selected from the following is executed:
   cancellation of the power running control of the electric assist motor (10) by the electric motor power running calculation means (71b) when the revolution speed of the engine (7) exceeds the target electric motor revolution speed by a prescribed value or more; and
   cancellation of the reduction control of the absorption torque of the hydraulic pump (6) by the hydraulic pump absorption torque calculation means (71d) when the revolution speed of the engine (7) exceeds the target hydraulic pump revolution speed by a prescribed value or more.

* * * * *